J. W. OSBURN.
Vehicle-Shaft Supporter.
No. 216,214.  Patented June 3, 1879.
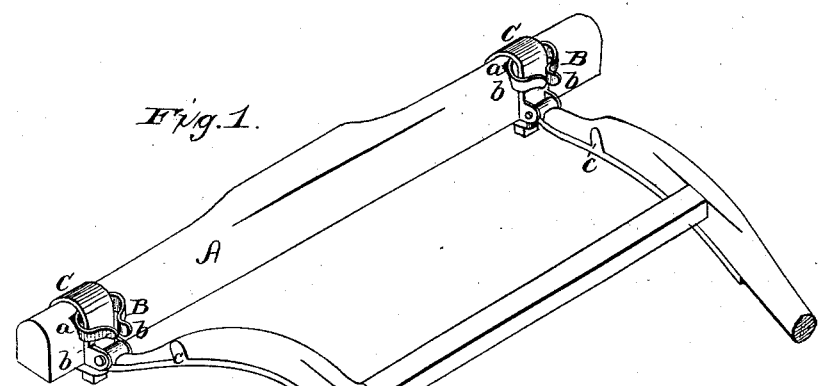
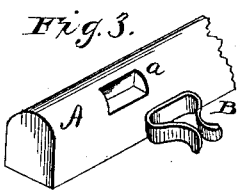
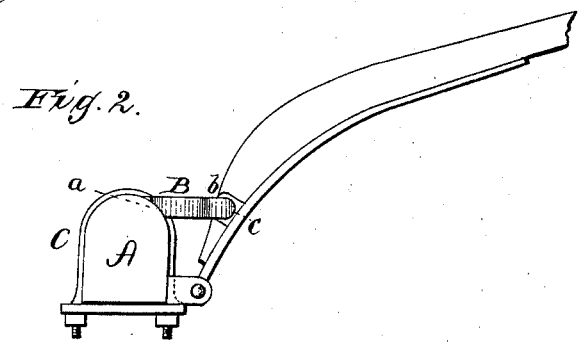
WITNESSES
F. L. Durand
J. J. McCarthy
INVENTOR
J. W. Osburn
Alexander Mason
BY ATTORNEYS

UNITED STATES PATENT OFFICE.

JOSEPH W. OSBURN, OF YOUNGSVILLE, OHIO.

IMPROVEMENT IN VEHICLE-SHAFT SUPPORTERS.

Specification forming part of Letters Patent No. 216,214, dated June 3, 1879; application filed September 12, 1878.

*To all whom it may concern:*

Be it known that I, JOSEPH W. OSBURN, of Youngsville, in the county of Adams, and in the State of Ohio, have invented certain new and useful Improvements in Vehicle-Shaft Supporters; and do hereby declare that the following is a full, clear, and exact description thereof, reference being had to the accompanying drawings, and to the letters of reference marked thereon, making a part of this specification.

The nature of my invention consists in the construction and arrangement of a shaft-supporter, as will be hereinafter more fully set forth.

In order to enable others skilled in the art to which my invention appertains to make and use the same, I will now proceed to describe its construction and operation, referring to the annexed drawings, in which—

Figure 1 is a perspective view of my shaft-supporter attached to the bed-piece of a vehicle; Fig. 2, an end view of the same. Fig. 3 is a detail view.

A represents the bed-piece of the front axle of a vehicle, in which are recesses $a\ a$, cut in its upper forward side near each end.

B B are two elastic clamps, of steel or any suitable elastic material, elliptic, round, or made in any desired shape most suitable for the purpose. These clamps are placed within the grooves or recesses $a\ a$, and held rigidly at any required angle to suit the curvature of the shafts by the ordinary clips C C, and are made of sufficient strength to retain the shafts when raised and forced between their projecting ends, which are provided with bends or curves $b\ b$, causing their extremities to diverge, thereby facilitating an easy, sure entrance of the shafts.

$c\ c$ are two metallic pieces let in shallow mortises in the shafts or poles at such points as come in contact with the diverging jaws of my clamp when being inserted in the same, for preventing wearing by friction thus occasioned.

To use my clamp as a supporter for vehicle-poles, when the horses are removed, place one or more, as the case may require, at a proper point or points, either on the cross-bar of the front spring, foot-board, or forward end of the wagon-body.

I do not broadly claim a spring for holding the vehicle-shafts in an elevated position, as I am aware that such is not new.

Having thus fully described my invention, what I claim as new, and desire to secure by Letters Patent, is—

1. The spring-clamps B B, confined by means of the clips C C in recesses $a\ a$ on the bed-piece A, substantially as and for the purposes herein set forth.

2. The combination of the shafts provided with the wear-irons $c\ c$, the spring-clamps B B, the recessed bed-piece A, and the shaft-clips C C, all substantially as and for the purposes herein set forth.

In testimony that I claim the foregoing I have hereunto set my hand this 25th day of July, 1878.

JOSEPH W. OSBURN.

Witnesses:
J. N. TAYLOR,
JNO. P. WOODWARD.